United States Patent [19]

Grimsley

[11] 4,011,793

[45] Mar. 15, 1977

[54] PORTABLE BORING BAR

[76] Inventor: Ernest E. Grimsley, 4533 Wake Forest Road, Portsmouth, Va. 23703

[22] Filed: Oct. 7, 1975

[21] Appl. No.: 620,408

[52] U.S. Cl. .................................. 90/12.5; 408/80
[51] Int. Cl.² ......................................... B23C 1/20
[58] Field of Search ................ 90/12.5; 408/79, 80, 408/81, 7.9

[56] References Cited

UNITED STATES PATENTS

| | | | |
|---|---|---|---|
| 2,480,307 | 8/1949 | Santro | 90/12.5 |
| 3,881,396 | 5/1975 | Case | 90/12.5 |

*Primary Examiner*—Gil Weidenfeld
*Attorney, Agent, or Firm*—Griffin, Branigan and Butler

[57] ABSTRACT

A small compact and light-weight tool is provided which is capable of boring and honing in-situ the seal ring seats of different sizes of high pressure valves. The tool housing support is threaded so that after removal of the valve stem and bonnet the tool may be screwed into the valve body. The support housing is internally threaded throughout its entire length for receiving and mating with an externally threaded feed screw. The feed screw is essentially a hollow cylinder having bearings therein for rotatably supporting a drive shaft. The drive shaft is adapted at one end to be driven and is adapted at the other end to receive the cutting tool holder, the cutting tool holder extending into the valve when the tool is mounted thereon. An internally threaded positive stop ring engages the feed screw and the setting of the stop ring determines the maximum depth of boring. Boring is accomplished by rotating the drive shaft to thereby rotate the cutting tool while axially advancing the drive shaft by rotating the feed screw. The stop ring engages the support housing to stop axial advancement of the feed screw and the drive shaft when the desire depth of boring has been accomplished.

10 Claims, 1 Drawing Figure

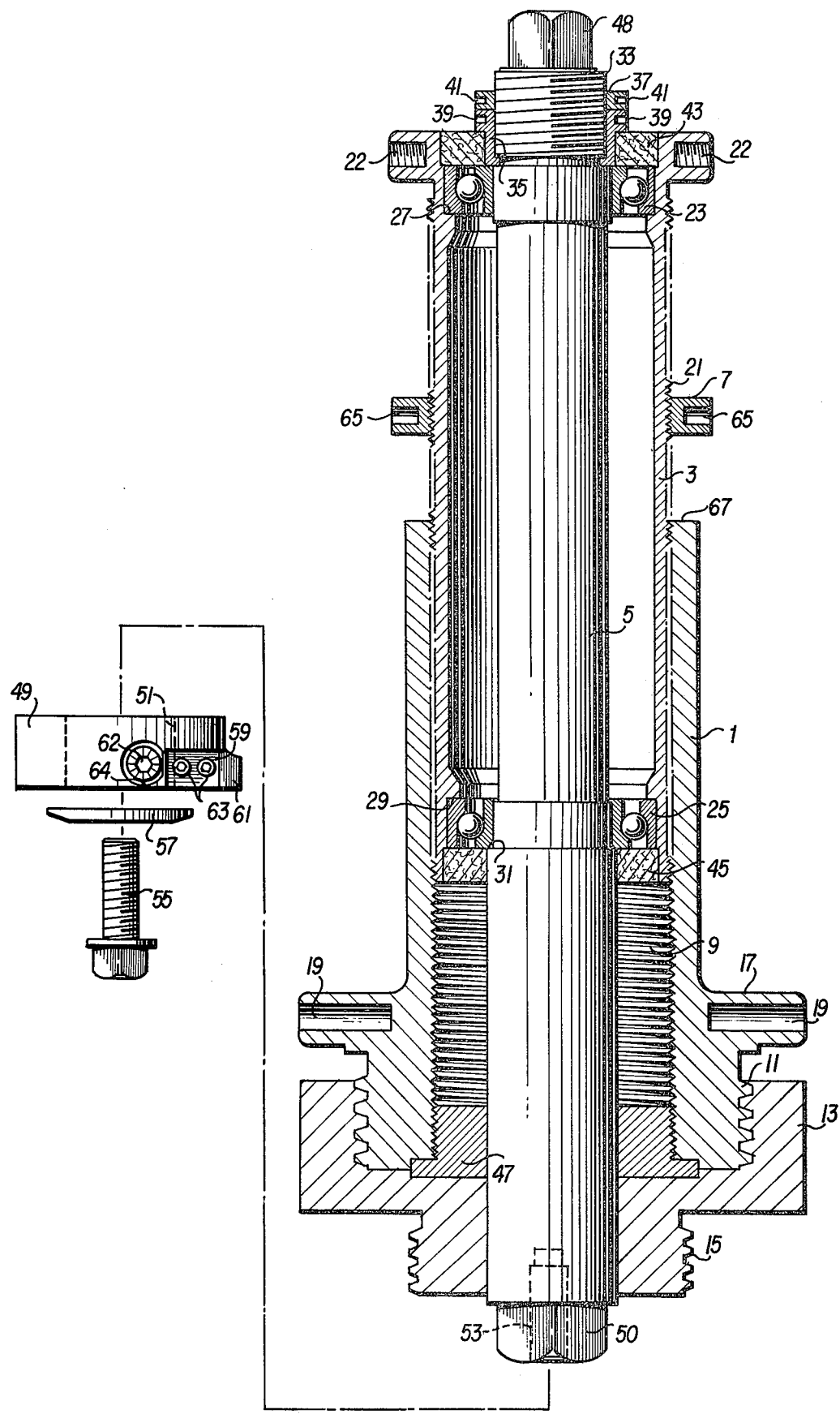

PORTABLE BORING BAR

BACKGROUND OF THE INVENTION

In the past, it has been extremely difficult and expensive to replace the metal seal rings of high pressure steam valves such as those found in power plants and on naval vessels. Typically, valves of this type come in a range of sizes (1 – 12 inches) and must be extremely heavy in order to function properly in systems where the steam pressure may range from 600 to 1500 psi. Because the valves are welded in the steam lines in which they are used, it is extremely difficult and very expensive to remove the valves from the system for transporting them to a shop for repair. Typically, it has in the past cost several thousand dollars to repair, transport and reinstall one small valve, and upwards of ten thousand dollars to repair one valve over the six inch size. On the other hand, it is also difficult and, more often than not, impossible to repair the valves without removing them from the system. This is due in part to the fact that the valves are often located in small spaces impeded by piping and other valves so that it is impossible to reach them with the bulky tools presently available for refinishing the valve seal ring seats. It is also due to the fact that the prior art tools were extremely heavy. This is particularly true where the valve, though accessible, is located near a bulkhead or near a compartment ceiling on a naval vessel. A typical prior art tool for refinishing the seal ring seats of such valves has weighed approximately 900 to 1,000 pounds and has required the services of three men for several hours in order to set it up in proper alignment for the refinishing of one valve seal ring seat.

Recently, a portable boring bar was developed which solved many problems of the prior art. This portable boring bar is disclosed in U.S. Pat. No. 3,881,396, which is assigned to the present inventor. While the portable boring bar disclosed in the aforementioned patent solved many of the problems of the prior art, it has not proved to be entirely satisfactory in operation because of a tendency to "chatter" and bore "out-of-round". It has been found that these problems result from a lack of strength of the main housing support, and the fact that the design permits dirt and other foreign particles to enter the tool and wear surfaces which must be maintained within close tolerances.

SUMMARY OF THE INVENTION

An object of the present invention is to provide an improved portable tool for refinishing the seal ring seats of high pressure valves, said tool providing more accurate refinishing and less chatter than similar tools heretofore known.

An object of the present invention is to provide a compact light weight portable boring bar which can be transported and set up by a single operator to accurately bore and refinish the surfaces of seal ring seats in high pressure valves.

A further object of the invention is to provide a portable tool adapted for boring the seal ring seats of high pressure valves, the tool including a hollow cylindrical housing support having threads on its interior surface, a rotatable cylindrical feed screw having exterior threads thereon for engaging the threads on the cylindrical housing, means holding a cutting tool, a drive shaft extending through and beyond the feed screw and the housing support, the drive shaft being adapted at one end for connection to the driving means and adapted at the other end for receiving the means holding the cutting tool, and first and second bearing means mounted inside the feed screw for rotatably supporting the drive shaft in fixed relation to the feed screw whereby the drive shaft and the tool holder are moved actually as the feed screw is rotated relative to the housing support.

Another object of the invention is to provide a tool as described above and further comprising a bearing mounted in one end of the housing support for rotatably supporting the drive shaft and sealing one end of the interior portion of the housing support, the other end of the housing support being sealed by further bearing means so that no dirt or foreign matter may enter the housing support.

Other objects of the invention and its mode of operation will become apparent upon consideration of the following description and the accompanying drawing.

BRIEF DESCRIPTION OF THE DRAWINGS

The drawings comprise a single FIGURE which is a partially exploded and part sectional view of the invention.

DETAILED DESCRIPTION OF THE INVENTION

As illustrated in the drawing, a preferred embodiment of the invention comprises a housing suport 1, a feed screw 3, a drive shaft 5 and a positive stop ring 7. The housing support 1 is essentially a hollow cylinder having interior threads 9 extending throughout its length. As its lower end the housing support has an enlarged outer diameter to provide additional strength and this portion is provided with exterior threads 11. By means of threads 11 the housing support 1 may be screwed into the top of a valve after the bonnet has been removed therefrom. Alternatively, the housing support 1 may be mounted on the valve body by means of an adapter 13 as taught in U.S. Pat. No. 3,881,396. As shown in that patent, the adapter is provided with a recess having internal threads for engagement with the housing support. At its lower end the adapter is provided with external threads 15 by means of which the adapter may be screwed into the valve body. Although adapter 13 is shown as having exterior threads 15, it will be understood that the adapter may have a recessed lower surface with interior threads as shown in the aforementioned patent so that the adapter may be screwed on over a valve body having exterior threads.

Above the threads 11 the housing support 1 is provided with a much enlarged diameter forming a flange-like ring 17. This ring is provided with a plurality of holes or recesses 19 into which pins or other tools may be inserted for the purpose of turning the housing support 1 and screwing it or the adapter 13 onto the valve body.

The feed screw 3 is essentially a hollow cylinder having exterior threads 21 extending throughout its length. The threads 21 engage the threads 9 on the internal surface of housing support 1 so that the feed screw moves into or out of the housing support as the feed screw is turned. The upper end of the feed screw is enlarged to form a flange-like ring. This ring is provided with a plurality of threaded holes 22 into which handles (not shown) may be inserted for the purpose of turning the feed screw 3.

The drive shaft 5 extends through and beyond the housing support 1 and the feed screw 3, and is moved axially as the feed screw is rotated. The drive shaft 5 is mounted in first and second bearings 23 and 25 which are in turned positioned within the feed screw 3. The feed screw is provided with a first ring-like internal projection 27 which limits downward movement of bearing 23 relative to the feed screw, and a second internal ring-like projection 29 which limits upward movement of the bearing 25 relative to the feed screw. The diameter of drive shaft 5 is enlarged below bearing 25 so as to provide an abutment 31 for engaging the lower surface of bearing 25. Near its upper end, the drive shaft 5 is provided with a threaded portion 33 for receiving an internally threaded thrust ring 35 and an internally threaded lock ring 37. The lower surface of thrust ring 35 engages the upper surface of bearing 23 so that as the thrust ring is screwed onto drive shaft 5 it moves the drive shaft upwardly to thereby cause the abutment 31 to engage the bearing 25. Thus, the thrust ring provides a means for compensating for wear in the bearings 23 and 25.

To facilitate rotation of the thrust ring 35, it is provided with a plurality of holes 39 spaced around its periphery for receiving turning pins or another suitable turning tool. After the thrust ring has been adjusted, it is locked in place by tightly turning the lock ring until it is screwed downwardly against the thrust ring. To facilitate the turning of lock ring 37, it is provided with a plurality of holes 41 similar to the holes 39.

An upper bearing seal 43 is provided to prevent the entry of dirt or other foreign matter into the bearing 23. In like manner, a lower bearing seal 45 is provided to prevent the entry of foreign matter into the bearing 25.

The drive shaft is provided with a support bearing 47 which is exteriorly threaded and screwed into the bottom opening of housing support 1.

The upper end of the drive shaft 5 is shaped in the form of a hex-head nut to receive a suitable electrically or pneumatically powered drive means. The lower end of the drive shaft is also shaped in the form of a hex-head nut. A cutting tool holder 49 having an hexagonal opening 51 extending therethrough is adapted to be inserted over the hexagonal portion 50 of the drive shaft. The drive shaft 5 is threaded at 53 to receive a retaining bolt 55. After the cutting tool holder 49 is inserted over the hexagonal portion 50 the retaining bolt 55 is inserted through a lock washer 57 and the cutting tool holder 49 and screwed into the end of the drive shaft 5.

A cutting tool 59 having a cutting surface 61 is attached to the cutting tool holder by means of a pair of Allen screws 63. An adjustment screw 62 is tapered at the interior end to provide a camming surface which acts against the tool 59 to adjust the radial cut. The screw 62 is provided with markings graduated in thousandths of an inch which may align with a mark 64 on the surface of tool holder 49 to thereby indicate to an operator the amount by which the radial cut is being changed. The adjustment is made with screws 63 snug but not tight, and after the adjustment screws 63 are securely tightened.

The purpose of stop ring 7 is to positively limit the depth to which boring may take place. The stop ring 7 is provided with interior threads which mate with the exterior of the feed screw 3. Prior to beginning a boring operation the tool operator backs off the feed screw 3 until the cutting tool 59 abuts adapter 13, if one is used, or abuts support bearing 47 if an adapter is not being used. The operator then rotates stop ring 7 so that the distance between the lower surface of the lock ring and the upper surface of the housing support 1 is equal to the maximum depth to which boring is to be accomplished. The setting of stop ring 7 is easily accomplished by inserting pins or another suitable tool into one more of the holes 65 provided in the periphery of the stop ring. After the stop ring 7 is set, plastic set screws (not shown) are tightened to prevent rotation of the stop ring relative to feed screw 3.

The boring of a seal ring seat is accomplished as follows. If an adapter 13 is to be used then the housing support is screwed into the adapter and the adapter screwed into the valve after removal of the bonnet therefrom. After the tool is firmly in place on the valve the operator sets the maximum depth of boring by adjusting the stop ring 7. The power drive means is then attached to the upper end 48 of the drive shaft and as the drive means is actuated the drive shaft rotates the cutting tool 59. The cutting tool is then manually fed downwardly by rotating the feed screw 3. This is accomplished by inserting handles into one or more of the threaded holes 22 provided around the periphery at the upper enlarged portion of the feed screw. It will be understood that as the feed screw 3 is moved downwardly into housing support 1, the drive shaft 5 and the cutting tool 59 are moved downwardly by corresponding amounts. This downward movement may continue as long as the operator rotates the feed screw 3, or until the stop ring 7 engages the upper surface 67 of the housing support 1. At this point the stop ring bends against the surface 67 of housing support 1 and prevents any further downward movement of the feed screw and the drive shaft. At this time the maximum depth of boring has been accomplished. The drive source for rotating the drive shaft 5 is then terminated and/or disconnected and the tool removed from the top of the valve.

It is thus seen that the present invention provides a very simple, yet rugged tool suitable for boring sealed ring seats in valves without removing the valves from their operating environment. Furthermore, the construction is such that foreign matter cannot enter the interior of the housing support or the feed screw to thus cause wear which in turn results in out-of-round boring and/or chattering of the tool while boring. By making feed screw 3 hollow, but of fairly large diameter, great strength and rigidity is obtained while at the same time keeping the weight of the tool to a minimum.

Although a specific preferred embodiment of the invention has been described in great detail, it will be understood that the invention may be practiced otherwise than as specifically shown. For example, instead of employing a nut-shaped end 53 on the drive shaft 5 and a hex-shaped hole in cutting tool holder 49, it may in some instances be preferable to merely provide a threaded stud on the tool holder 49, the threaded stud being adapted to be screwed directly into the threaded hole 53 on the drive shaft. It is intended therefore to be limited only by the scope of the appended claims.

I claim:

1. A tool adapted for boring the seal ring seats of high pressure valves, said tool comprising:
    a hollow cylindrical housing support having threads on its interior surface;
    a rotatable cylindrical feed screw having exterior threads thereon for engaging the threads on said interior surface;
    means holding a cutting tool;

a drive shaft extending through and beyond said feed screw and said housing support, said drive shaft having a diameter much smaller than the internal diameter of said feed screw;

means at one end of said drive shaft for connecting said drive shaft to a driving means and means at the other end for receiving said means holding a cutting tool;

first and second bearing means mounted inside said feed screw rotatably supporting said drive shaft in fixed relation to said feed screw whereby said drive shaft and tool holder are moved axially as said feed screw is rotated relative to said housing support.

2. A tool as claimed in claim 1 and further comprising a third bearing means within said housing support at one end thereof for supporting said drive shaft and sealing one end of the interior portion of said housing support, the other end thereof being sealed by said second bearing means.

3. A tool adapted for boring the seal ring seats of high pressure valves, said tool comprising:

a hollow cylindrical housing support having threads on its interior surface;

a rotatable cylindrical feed screw having exterior threads mounted thereon for engaging the threads on said interior surface;

means holding a cutting tool;

a drive shaft extending through and beyond said feed screw and said housing support;

means at one end of said drive shaft for connecting said drive shaft to a driving means and means at the other end for receiving said means holding a cutting tool;

first and second bearing means mounted inside said feed screw rotatably supporting said drive shaft in fixed relation to said feed screw whereby said drive shaft and tool holder are moved axially as said feed screw is rotated relative to said housing support and, a thrust ring having internal threads, said drive shaft having external threads in the region where said drive shaft extends beyond said feed screw for receiving said thrust ring, said thrust ring acting against said first bearing means to move said drive shaft in a given direction relative to said thrust ring and said drive shaft having an enlarged diameter which acts against said second bearing means to limit movement of said drive shaft in said given direction relative to said thrust ring.

4. A tool as claimed in claim 3 and further comprising an internally threaded stop ring mounted on said feed screw and adapted to engage said housing support as said feed screw is rotated and moved into said housing support, said stop ring preventing further rotation of said feed screw when the lock ring engages the housing support.

5. A tool as claimed in claim 1 and further comprising means for rotating said drive shaft.

6. A tool as claimed in claim 1 and including means for mounting said tool on a valve after the valve bonnet has been removed therefrom.

7. A tool as claimed in claim 1 and further comprising an internally threaded stop ring mounted on said feed screw and adapted to engage said housing support as said feed screw is rotated and moved into said housing support, said stop ring preventing further rotation of said feed screw when the lock ring engages the housing support.

8. A tool as claim in claim 3 and further comprising means for rotating said drive shaft.

9. A tool as claim in claim 3 and including means for mounting said tool on a valve after the valve bonnet has been removed therefrom.

10. A tool as claimed in claim 3 and further comprising a third bearing means within said housing support at one end thereof for supporting said drive shaft and sealing one end of the interior portion of said housing support, the other end thereof being sealed by said second bearing means.

* * * * *